(12) United States Patent
Velikevitch et al.

(10) Patent No.: US 10,892,891 B2
(45) Date of Patent: Jan. 12, 2021

(54) SYSTEM, METHOD, AND COMPUTER PROGRAM PRODUCT FOR ZERO ROUND TRIP SECURE COMMUNICATIONS BASED ON TWO NOISY SECRETS

(71) Applicant: Dark Matter L.L.C., Dubai (AE)

(72) Inventors: Serguei Velikevitch, Richmond Hill (CA); Alexander Sherkin, Vaughan (CA)

(73) Assignee: DIGITAL 14 LLC, Abu Dhabi (AE)

( * ) Notice: Subject to any disclaimer, the term of this patent is extended or adjusted under 35 U.S.C. 154(b) by 196 days.

(21) Appl. No.: 16/352,531

(22) Filed: Mar. 13, 2019

(65) Prior Publication Data

US 2020/0295924 A1 Sep. 17, 2020

(51) Int. Cl.
*H04L 9/32* (2006.01)
*H04L 9/08* (2006.01)

(52) U.S. Cl.
CPC ............ *H04L 9/0822* (2013.01); *H04L 9/085* (2013.01); *H04L 9/3242* (2013.01); *H04L 9/0869* (2013.01)

(58) Field of Classification Search
CPC ..... H04L 9/3242; H04L 9/0822; H04L 9/088; H04L 9/3026; H04L 9/085; H04L 9/0869
See application file for complete search history.

(56) References Cited

U.S. PATENT DOCUMENTS

| | | | | |
|---|---|---|---|---|
| 4,168,396 A * | 9/1979 | Best | ................... | G06F 12/1408 713/190 |
| 6,055,508 A * | 4/2000 | Naor | ................. | G06Q 10/0639 705/7.38 |
| 6,658,569 B1 * | 12/2003 | Patarin | ................... | G06F 7/723 713/194 |
| 7,657,033 B2 * | 2/2010 | Fiske | ................... | H04L 9/0631 380/259 |
| 8,345,861 B2 * | 1/2013 | Schneider | ............... | H04L 9/085 380/28 |
| 8,677,123 B1 * | 3/2014 | McGregor, Jr. | ........... | H04L 9/00 713/168 |
| 9,191,200 B1 * | 11/2015 | Adams | ................... | G06F 21/60 |
| 9,331,984 B2 * | 5/2016 | Matsuo | ............... | H04L 63/0428 |
| 9,690,949 B1 * | 6/2017 | Diorio | .................... | H04L 9/321 |
| 9,819,657 B2 * | 11/2017 | Tasher | .................. | H04L 9/0662 |
| 10,348,491 B2 * | 7/2019 | Ikarashi | .................. | H04L 9/085 |
| 10,411,886 B1 * | 9/2019 | Vermeulen | ............ | H04L 63/061 |
| 10,601,585 B1 * | 3/2020 | Robinson | .............. | H04L 9/0894 |

(Continued)

*Primary Examiner* — Shahriar Zarrineh
(74) *Attorney, Agent, or Firm* — Zilka-Kotab, P.C.

(57) ABSTRACT

Zero round trip secure communications is implemented based on two noisy secrets. A sender system: calculates a required number of sub-keys to have at least one noiseless sub-key; for each first negotiated secret sub-key, uses the sub-key to encrypt a first half of a message key and test bytes, and adds the encrypted first half of the message key and the encrypted test bytes to the encrypted message; for each second negotiated secret sub-key, uses the sub-key to encrypt a second half of the message key and the test bytes, and adds the encrypted second half of the message key and the encrypted test bytes to the encrypted message; and sends the encrypted message, message MAC information, encrypted first halves of the message key with associated encrypted test bytes, and encrypted second halves of the message key with associated encrypted test bytes to a receiver.

20 Claims, 7 Drawing Sheets

(56) References Cited

U.S. PATENT DOCUMENTS

| | | | | |
|---|---|---|---|---|
| 2004/0019785 | A1* | 1/2004 | Hawkes | H04L 9/3242 713/168 |
| 2004/0255133 | A1* | 12/2004 | Lei | G06F 21/6227 713/193 |
| 2007/0286416 | A1* | 12/2007 | Bertoni | H04L 9/3242 380/37 |
| 2009/0136024 | A1* | 5/2009 | Schneider | H04L 9/085 380/28 |
| 2010/0211787 | A1* | 8/2010 | Bukshpun | H04L 9/065 713/170 |
| 2013/0010953 | A1* | 1/2013 | Seurin | H04L 9/085 380/255 |
| 2014/0095892 | A1* | 4/2014 | Lai | G06F 21/78 713/190 |
| 2014/0189348 | A1* | 7/2014 | El-Shimi | G06F 21/6218 713/165 |
| 2015/0270968 | A1* | 9/2015 | Nairn | H04L 9/3242 713/181 |
| 2016/0154966 | A1* | 6/2016 | Fiske | H04L 63/0428 726/26 |
| 2017/0118016 | A1* | 4/2017 | Shibutani | H04L 9/0861 |
| 2017/0155510 | A1* | 6/2017 | Cloostermans | H04L 9/3093 |
| 2017/0170961 | A1* | 6/2017 | Androulaki | G06F 12/1408 |
| 2017/0359843 | A1* | 12/2017 | Bell | H04W 12/0602 |
| 2019/0087594 | A1* | 3/2019 | Nix | H04L 9/006 |
| 2019/0349192 | A1* | 11/2019 | Tolhuizen | H04L 9/0819 |
| 2020/0195427 | A1* | 6/2020 | Beck | H04L 9/0866 |
| 2020/0213099 | A1* | 7/2020 | Wright | H04L 9/088 |
| 2020/0313845 | A1* | 10/2020 | Rioul | H04L 9/002 |

* cited by examiner

SYSTEM, METHOD, AND COMPUTER PROGRAM PRODUCT FOR ZERO ROUND TRIP SECURE COMMUNICATIONS BASED ON TWO NOISY SECRETS

FIELD OF THE INVENTION

The present invention relates to implementing secure communications, and more particularly to implementing zero round trip secure communications based on two noisy secrets.

BACKGROUND

Secure communication based on a negotiated secret assumes that the secret is exactly the same for both the sender and the receiver. The secret allows both parties to derive the same key and use it to encrypt and decrypt messages. In the case when the negotiated secret is noisy, a reliable negotiation of the same key becomes a problem.

Having a noisy secret means that sender's version and the receiver's version of the negotiated secret have the same size but differ in a small number of bits. These bits are considered noisy bits. A noiseless sub-key has no noisy bits selected from the negotiated noisy secret. Message loss means that message cannot be decrypted on the receiver side because of a noisy key. Current systems fail to effectively address issues associated with negotiated noisy secrets.

There is thus a need for addressing these and/or other issues associated with the prior art.

SUMMARY

A system, method, and computer program product are provided for implementing zero round trip secure communications based on two noisy secrets. The method comprises: a) generating, by a sender system, a message key (e.g. a random message key) of a desired length for generating an encrypted message associated with two negotiated secrets; b) utilizing, by the sender system, a key derivation function to derive a message key encryption key and a message key message authentication code (MAC) key; c) encrypting, by the sender system, the message key with the derived message key encryption key; d) calculating, by the sender system, an encrypted message key MAC using the derived message key MAC key; e) calculating, by the sender system, a sub-key size by dividing a size of the message key by two; f) generating, by the sender system, random test bytes; g) calculating, by the sender system, a required number of sub-keys to have at least one noiseless sub-key with a given acceptable level of message loss (the number is the same for both negotiated secrets); h) selecting, by the sender system, a first sub-key from a first negotiated secret using a deterministic algorithm; i) encrypting, by the sender system, a first half of the message key using the first sub-key; j) encrypting, by the sender system, the test bytes using the first sub-key; k) adding, by the sender system, the first half of the message key and the test bytes encrypted using the first sub-key to the encrypted message; l) repeating, by the sender system, operations h through k until no sub-keys associated with the first negotiated secret are left; m) selecting, by the sender system, a second sub-key from a second negotiated secret using the deterministic algorithm; n) encrypting, by the sender system, a second half of the message key using the second sub-key; o) encrypting, by the sender system, the test bytes using the second sub-key; p) adding, by the sender system, the second half of the message key and the test bytes encrypted using the second sub-key to the encrypted message; q) repeating, by the sender system, operations m through p until no sub-keys associated with the second negotiated secret are left; and r) sending, by the sender system, the encrypted message, message MAC information (e.g. a message MAC computed on the ciphertext), encrypted first halves of the message key along with associated encrypted test bytes, and encrypted second halves of the message key along with associated encrypted test bytes to a receiver system.

DETAILED DESCRIPTION

Figure 1:
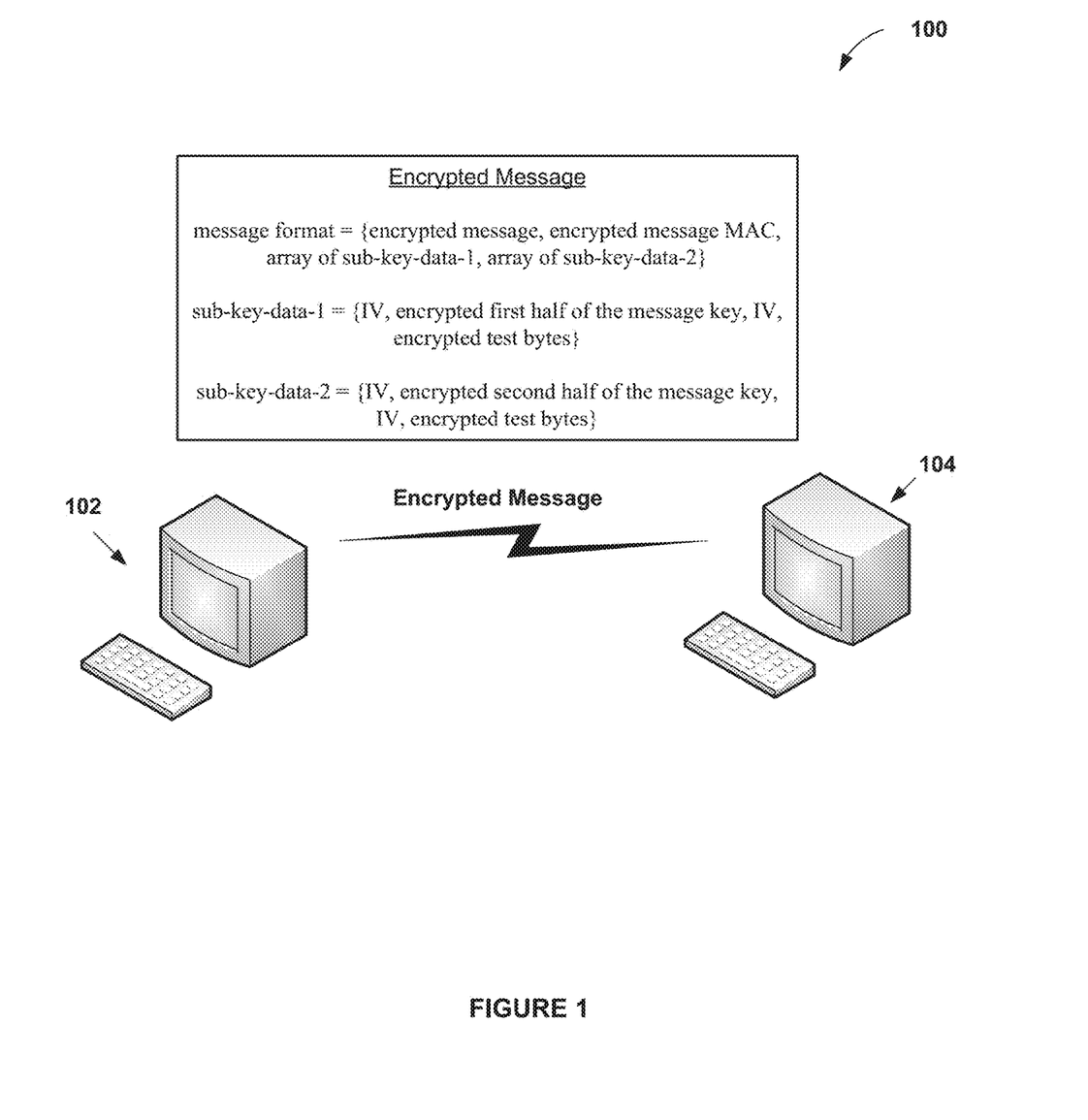
FIG. 1 shows a simplified system flow diagram for implementing zero round trip secure communications based on two noisy secrets, in accordance with one embodiment.

FIG. 1 shows a simplified system flow diagram 100 for implementing zero round trip secure communications based on two noisy secrets, in accordance with one embodiment.

In operation, the process implemented by a sender system 102 includes: a) generating a message key (e.g. a random message key) of a desired length for generating an encrypted message associated with two negotiated secrets; b) utilizing a key derivation function to derive a message key encryption key and a message key message authentication code (MAC) key; c) encrypting the message key with the derived message key encryption key; d) calculating an encrypted message key MAC using the derived message key MAC key; e) calculating a sub-key size by dividing a size of the message key by two; f) generating random test bytes; g) calculating a required number of sub-keys to have at least one noiseless sub-key with a given acceptable level of message loss (the number is the same for both negotiated secrets); h) selecting a first sub-key from a first negotiated secret using a deterministic algorithm; i) encrypting a first half of the message key using the first sub-key; j) encrypting the test bytes using the first sub-key; k) adding the first half of the message key and the test bytes encrypted using the first sub-key to the encrypted message; l) repeating operations h through k until no sub-keys associated with the first negotiated secret are left; m) selecting a second sub-key from a second negotiated secret using the deterministic algorithm; n) encrypting a second half of the message key using the second sub-key; o) encrypting the test bytes using the second sub-key; p) adding the second half of the message key and the test bytes encrypted using the second sub-key to the encrypted message; q) repeating operations m through p until no sub-keys associated with the second negotiated secret are left; and r) sending the encrypted message, message MAC information (e.g. a message MAC computed on the ciphertext, etc.), encrypted first halves of the message key along with associated encrypted test bytes, and encrypted second halves of the message key along with associated encrypted test bytes to a receiver system 104.

In one embodiment, the receiver system 104 may: obtain the number of sub-keys from the received encrypted message; select a sub-key from one negotiated secret (e.g. the first negotiated secret) using the deterministic algorithm used by the sender system; decrypt the test bytes using the sub-key; compare the test bytes with decrypted test bytes produced by sub-keys from another negotiated secret (e.g. the second negotiated secret); decrypt both halves of the message key if the test bytes and the decrypted test bytes produced by sub-keys from another negotiated secret are the same; use the key derivation function to derive a second message key encryption key and a second message key MAC key; verify a MAC associated with the encrypted message using the second message key MAC key; use the second message key encryption key to decrypt the encrypted message if the MAC associated with the encrypted message is verified; and/or determine not decrypt the encrypted message if the MAC associated with the encrypted message is verified.

The sender system 102 and/or the receiver system 104 may include any device capable of sending messages, such as a computer (e.g. tablet, laptop, desktop, etc.), a mobile phone, a gaming device, etc.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
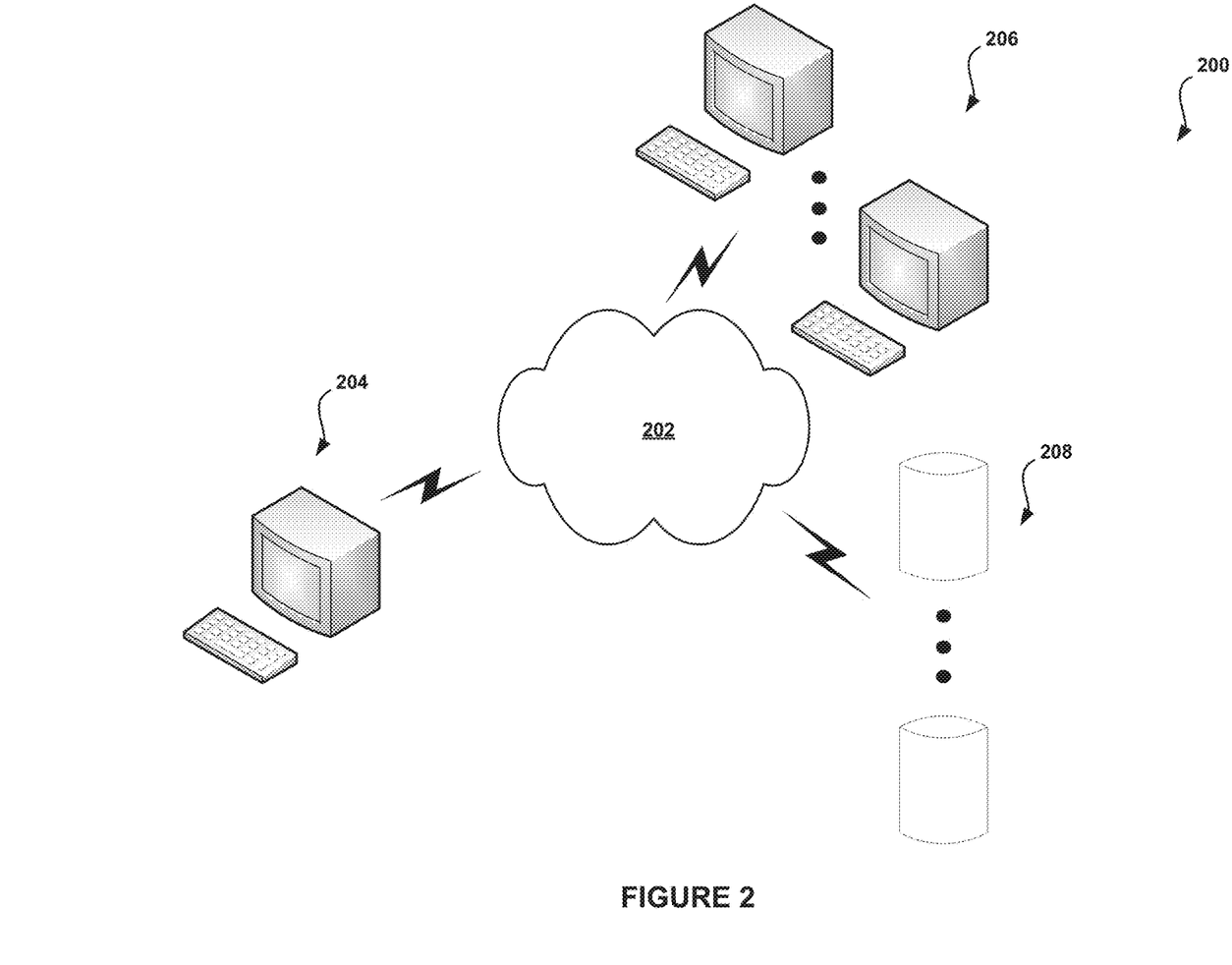
FIG. 2 shows a system for implementing zero round trip secure communications based on two noisy secrets, in accordance with one embodiment.

FIG. 2 shows a system 200 for implementing zero round trip secure communications based on two noisy secrets, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a system 204, which may implement a variety of applications or software, etc. The system 204 may be capable of communicating with a plurality of systems 206, either directly or over one or more networks 202, for ensuring secure communications based on two noisy secrets. The system 204 may also be in communication with one or more repositories/databases 208.

Secure communication based on noisy negotiated secret is possible even when the receiving party is not online to fix the noise. One way to do that is to use multiple sub-keys to encrypt message key, and send the list of the encrypted message keys to the recipient along with the actual encrypted message. The problem is that increasing key size increases the number of required sub-keys exponentially. One solution to reduce the overhead is to increase the acceptable level of message loss, but it is not always practical.

Sending secure messages based on a noisy negotiated secret requires using multiple keys to increase the probability that at least one key does not have any noise.

The system 200 allows using sub-key size as half of message key size. The approach greatly reduces the number of the required sub-keys and associated message overhead. Because message overhead is proportional to the number of sub-keys, the proposed approach allows systems to double the message key size while keeping bandwidth and computational overhead the same.

Figure 3:
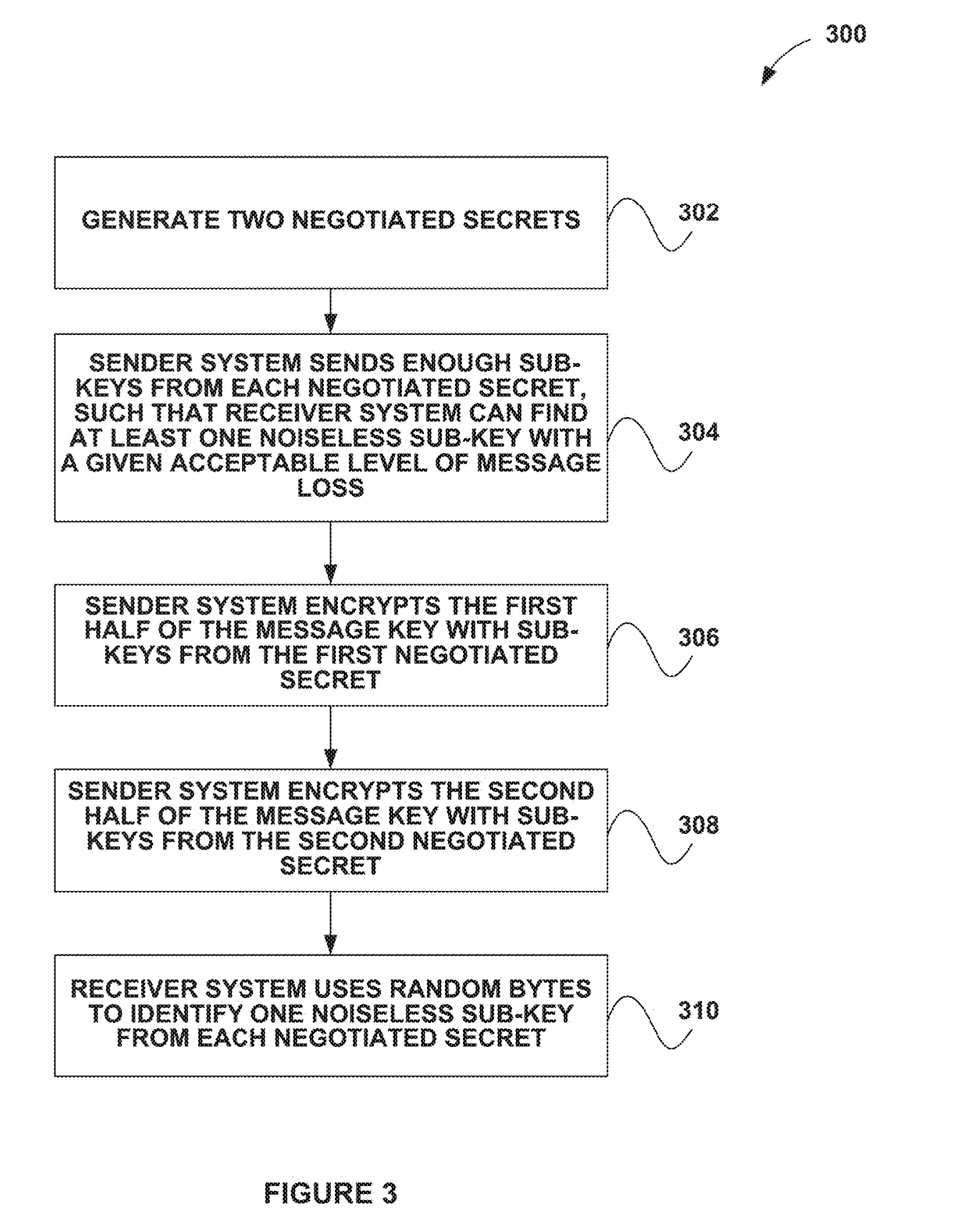
FIG. 3 shows a system flow diagram illustrating steps for implementing zero round trip secure communications based on two noisy secrets, in accordance with another embodiment.

FIG. 3 shows a system flow diagram 300 illustrating steps for implementing zero round trip secure communications based on two noisy secrets, in accordance with another embodiment. As an option, the system flow diagram 300 may be carried out in the context of any of the previously described figures. Of course, however, the system flow diagram 300 may be carried out in any desired context. It should also be noted that the aforementioned definitions may apply during the present description.

In operation, a sender system and a receiver system utilize two negotiated noisy secrets. See operation 302. For example, the client may choose two ephemeral key pairs where each ephemeral key will provide a unique secret when used with the recipient's static asymmetric key.

The sender system sends enough sub-keys from each negotiated secret, such that receiver system can find at least one noiseless sub-key with a given acceptable level of message loss. See operation 304.

The sender system encrypts the first half of the message key with sub-keys from the first negotiated secret. See operation 306.

The sender system encrypts the second half of the message key with sub-keys from the second negotiated secret. See operation 308.

The receiver system uses encrypted random bytes (as receiver does not have plaintext random bytes) to identify one noiseless sub-key from each negotiated secret. See operation 310. Random bytes are not sent to the receiver system in plaintext.

The sender system encrypts random bytes as plaintext with every sub-key. The receiver system does not know the plaintext, but each noiseless key must produce the same plaintext after decryption. In this way, two different sub-keys are required so an attacker faces the double sub-key cryptographic strength (equal to the desired message key strength) when attempting a brute force attack on the key.

The number of random bytes affects the probability of false positive outcomes. If message key size is 128 bits, sub-key size is 64 bits, and a 32-bit random byte array gives false positive outcome every $2^{16}=65,536$ sub-keys.

Figure 4:
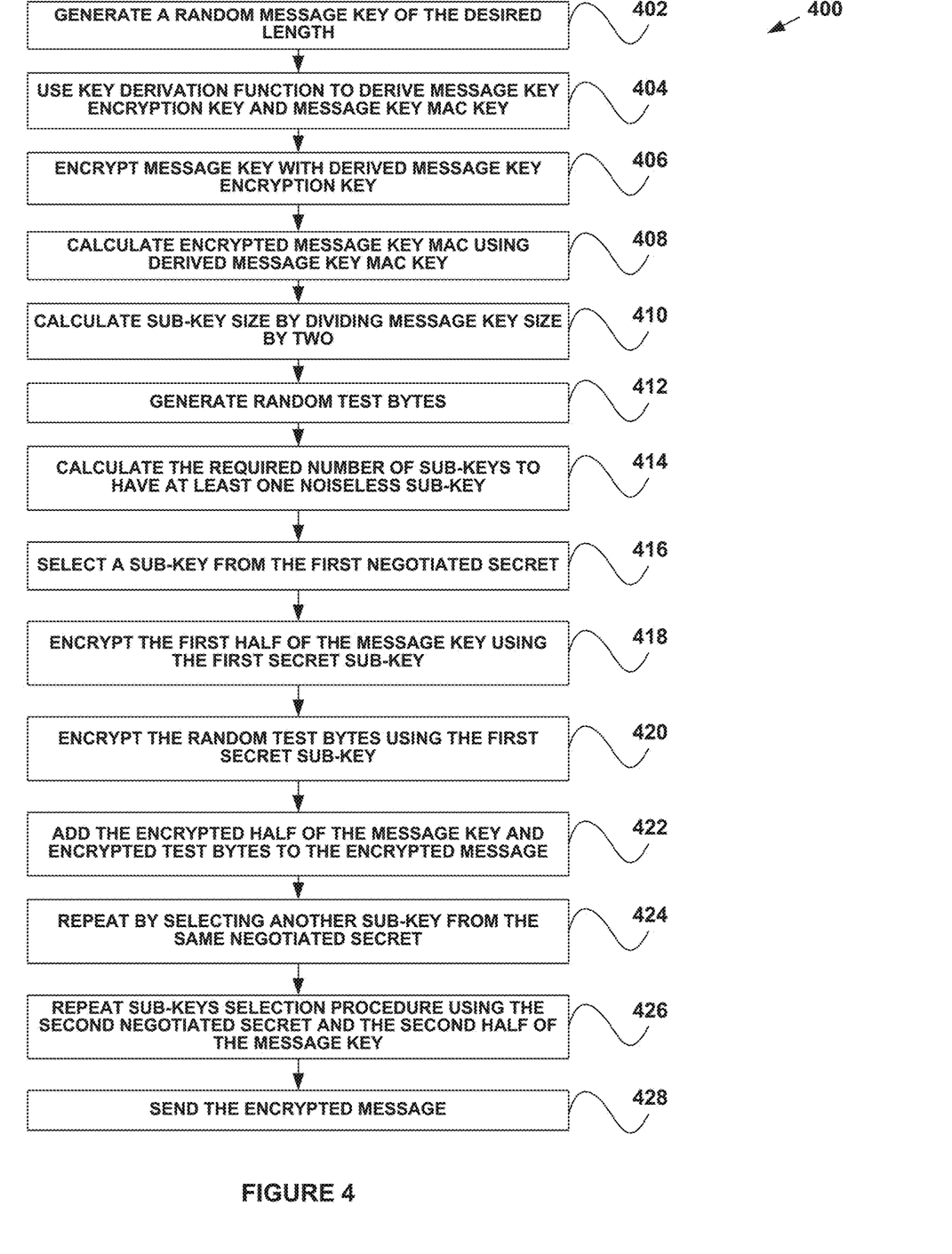
FIG. 4 shows a system flow diagram illustrating steps for a sender system implementing zero round trip secure communications based on two noisy secrets, in accordance with another embodiment.

FIG. 4 shows a system flow diagram 400 illustrating steps for a sender system implementing zero round trip secure communications based on two noisy secrets, in accordance with another embodiment. As an option, the system flow diagram 400 may be carried out in the context of any of the previously described figures. Of course, however, the system flow diagram 400 may be carried out in any desired context. It should also be noted that the aforementioned definitions may apply during the present description.

In operation, the sender system generates a random message key of the desired length. See operation 402. The sender system uses a key derivation function to derive a message key encryption key and a message key MAC key. See operation 404.

The sender system encrypts the message key with the derived message key encryption key. See operation 406. The sender system calculates an encrypted message key MAC using the derived message key MAC key. See operation 408.

The sender system calculates a sub-key size by dividing the message key size by two. See operation 410. The sender system then generates random test bytes. See operation 412.

The sender system calculates the required number of sub-keys to have at least one noiseless sub-key with the given acceptable level of message loss. See operation 414. The number is the same for both negotiated secrets.

The sender system selects a sub-key from the first negotiated secret using a deterministic algorithm. See operation 416. The sender system encrypts the first half of the message key using the first secret sub-key. See operation 418. The sender system encrypts the random test bytes using the first secret sub-key. See operation 420.

The sender system adds the encrypted half of the message key and encrypted test bytes to the encrypted message. See operation 422. The sender system repeats operations 416-422 by selecting another sub-key from the same negotiated secret, etc. See operation 424.

The sender system repeats the sub-key selection procedure using the second negotiated secret and the second half of the message key (i.e. operations 416-424). See operation 426. The sender system then sends the encrypted message, the message MAC computed on the ciphertext, the encrypted first halves of the message key along with the associated encrypted test bytes, and the encrypted second halves of the message key along with the associated encrypted test bytes. See operation 428.

The first negotiated secret's sub-key message data includes: sub-key-data-1={IV, encrypted first half of the message key, IV, encrypted test bytes}. The second negotiated secret's sub-key message data includes: sub-key-data-2={IV, encrypted second half of the message key, IV, encrypted test bytes}. The message format={encrypted message, encrypted message MAC, array of sub-key-data-1, array of sub-key-data-2}.

Figure 5:
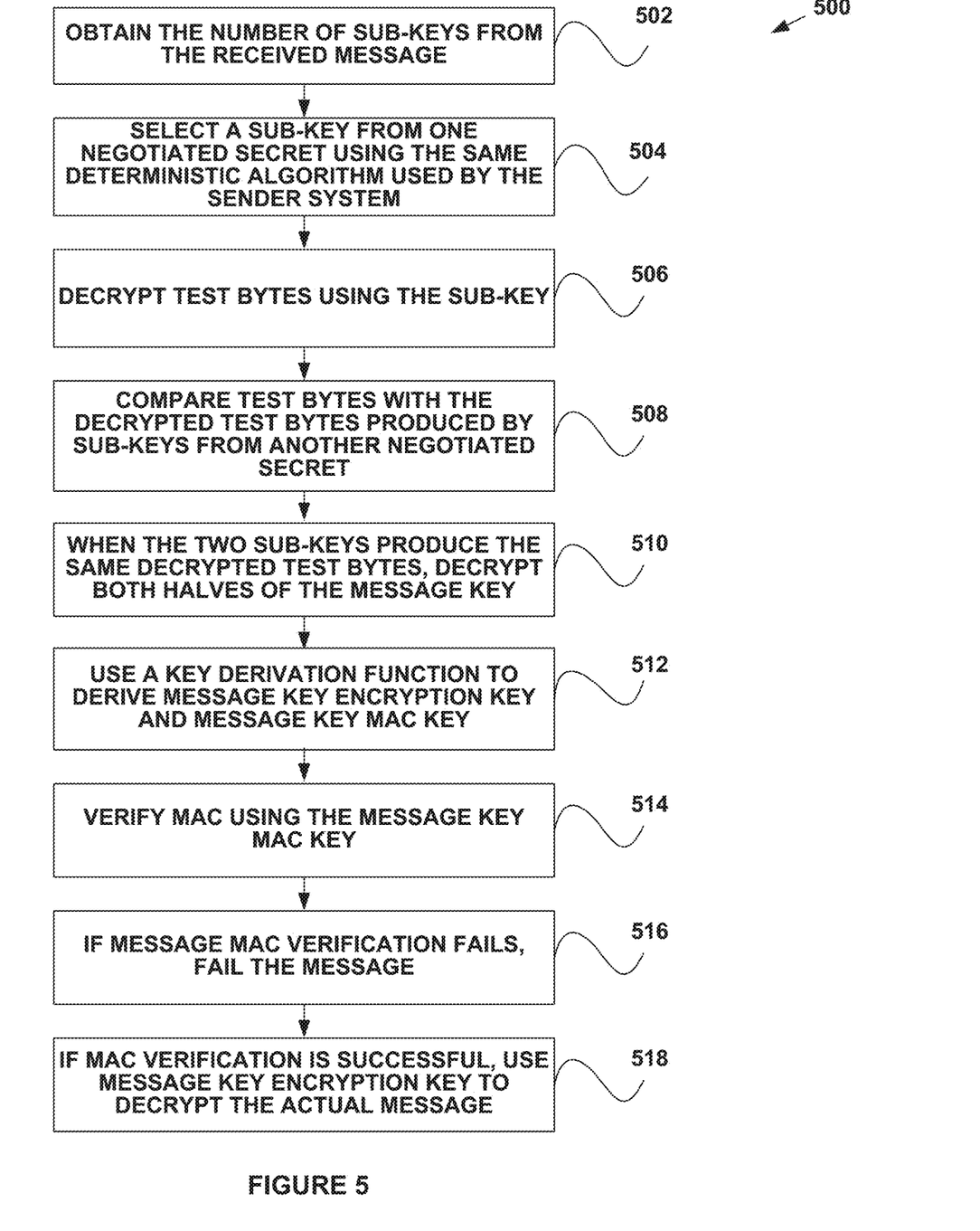
FIG. 5 shows a system flow diagram illustrating steps for a receiver system implementing zero round trip secure communications based on two noisy secrets, in accordance with another embodiment.

FIG. 5 shows a system flow diagram 500 illustrating steps for a receiver system implementing zero round trip secure communications based on two noisy secrets, in accordance with another embodiment. As an option, the system flow diagram 500 may be carried out in the context of any of the previously described figures. Of course, however, the system flow diagram 500 may be carried out in any desired context. It should also be noted that the aforementioned definitions may apply during the present description.

In operation, the receiver system obtains the number of sub-keys from the received message. See operation 502. The number is the same for both negotiated secrets. The receiver system selects a sub-key from one negotiated secret using the same deterministic algorithm used by the sender system. See operation 504.

The receiver system decrypts test bytes using the sub-key. See operation 506. The receiver system compares test bytes with the decrypted test bytes produced by sub-keys from another negotiated secret. See operation 508.

When the two sub-keys produce the same decrypted test bytes, the receiver system decrypts both halves of the message key. See operation 510. The receiver system uses a key derivation function to derive a message key encryption key and a message key MAC key. See operation 512.

The receiver system verifies the MAC using the message key MAC key. See operation 514. If the message MAC verification fails, the receiver system fails the message. See operation 516. In this case, there most likely was an attack on the message. If the MAC verification is successful, the receiver system uses the message key encryption key to decrypt the actual message. See operation 516.

As an existing solution example, assume a 128-bit message key, and 128-bit sub-keys. This example shows how many 128-bit sub-keys are required to achieve 0.999998 level of successful message delivery. The negotiated secret has 1024 bits, but 32 of them do not match for sender and receiver. Sub-key size is 128 bits. Sub-key bits are selected from the negotiated secret. Each sub-key requires extra information to be included: encrypted message key (128 bits), and encrypted message key MAC (256 bits). Overhead is 384 bits or 48 bytes per sub-key. The probability to have at least one noiseless sub-key from 1000 randomly selected sub-keys is 0.999998. Overhead is 1000*48=46.8 Kbytes.

As a solution example (as described herein), assume two negotiated secrets, 128-bit message key, and 64-bit sub-keys. There are two negotiated secrets. Both secrets have 1024 bits, but 32 of them do not match for sender and receiver. Required message key size is 128 bits. Sub-key size is 64 bits. Sub-key bits are selected from the negotiated secret using a deterministic algorithm. Each sub-key requires extra information to be included: encrypted random bytes (128 bits), encrypted half of the message key (128 bits), and two initialization vectors (2×128 bits). Overhead is 1024 bits or 128 bytes per sub-key. The probability to have at least one noiseless 64-bit sub-key from 100 randomly selected sub-keys is 0.999998. 100 keys are selected from the first negotiated secret and 100 from the second negotiated secret. For 200 sub-keys, the overhead is 200*128=25 Kbytes or 1.9 times less than in the existing solution. The receiver system has to try 200 sub-keys instead of 1000 sub-keys, which is 5 times less.

Figure 6:
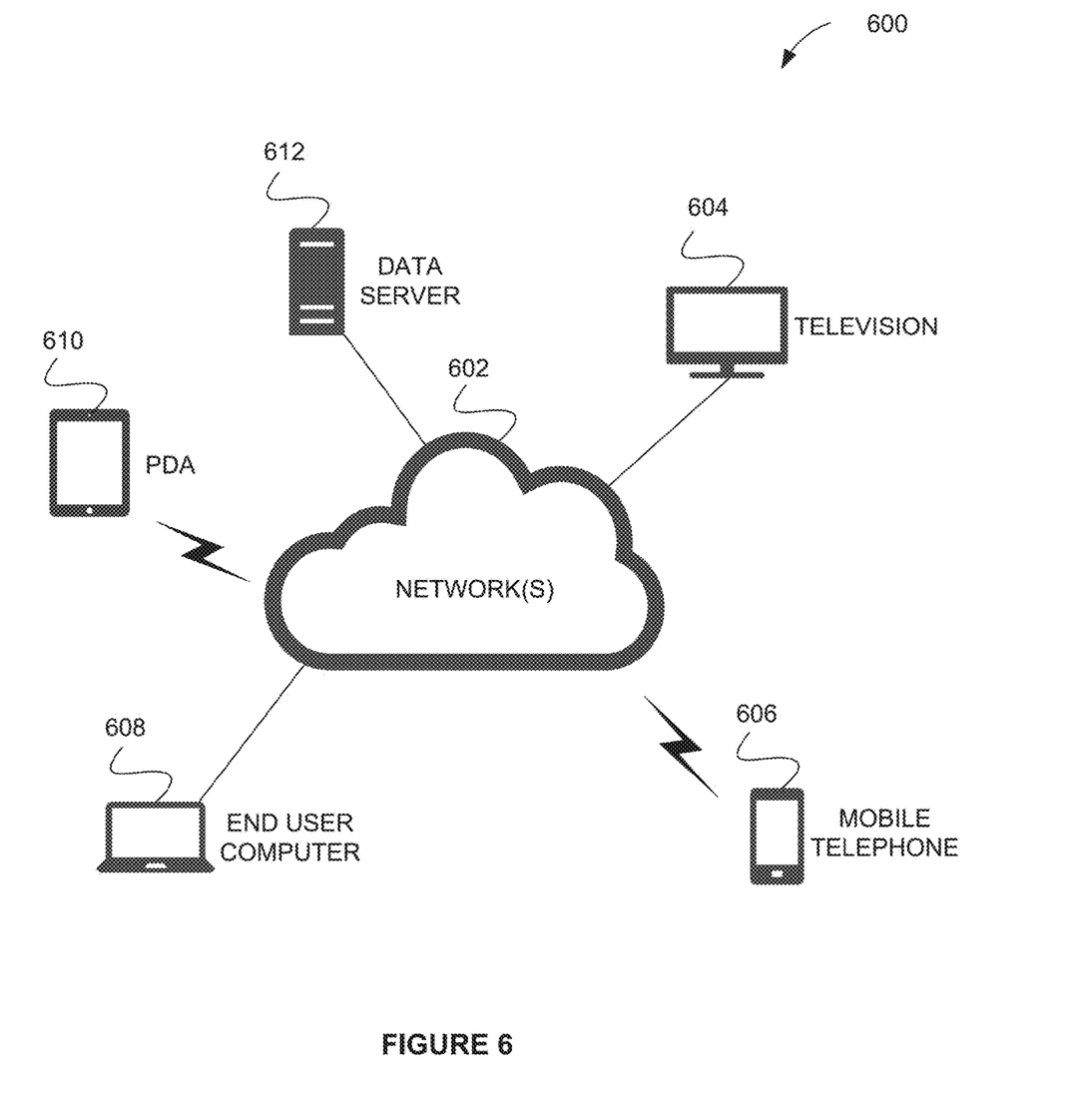
FIG. 6 illustrates a network architecture, in accordance with one embodiment.

FIG. 6 illustrates a network architecture 600, in accordance with one embodiment. As shown, at least one network 602 is provided. In various embodiments, any one or more components/features set forth during the description of any previous figure(s) may be implemented in connection with any one or more of the components of the at least one network 602.

In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 612 and an end user computer 608 may be coupled to the network 602 for communication purposes. Such end user computer 608 may include a desktop computer, lap-top computer, and/or any other type of logic. Still yet, various other devices may be coupled to the network 602 including a personal digital assistant (PDA) device 610, a mobile phone device 606, a television 604, etc.

Figure 7:
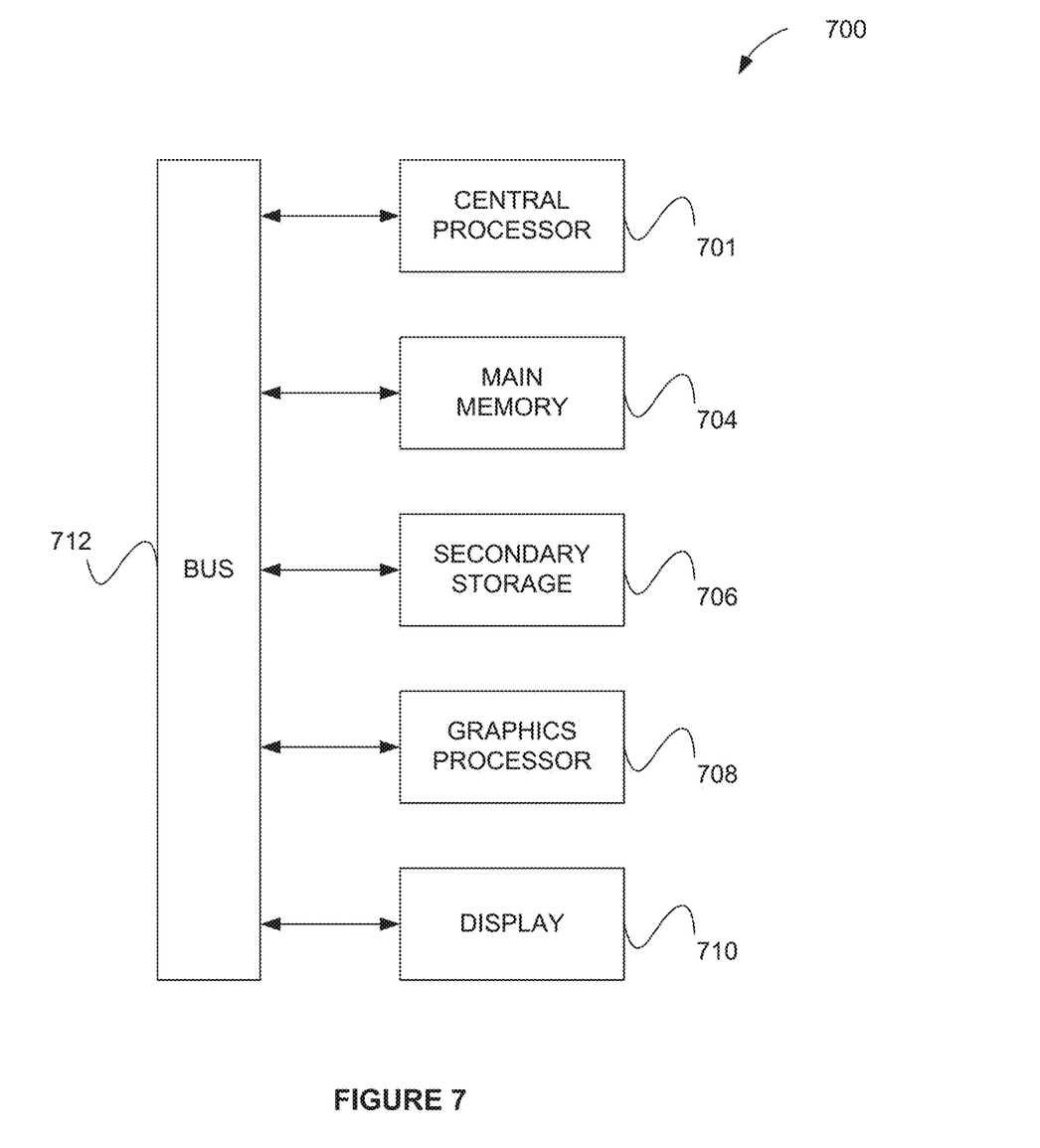
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. However, it is to be appreciated that the system 700 may be implemented in any desired environment.

As shown, a system 700 is provided including at least one central processor 702 which is connected to a bus 712. The system 700 also includes main memory 704 [e.g., hard disk drive, solid state drive, random access memory (RAM), etc.]. The system 700 also includes a graphics processor 708 and a display 710.

The system 700 may also include a secondary storage 706. The secondary storage 706 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 704, the secondary storage 706, and/or any other memory, for that matter. Such computer programs, when executed, enable the system 700 to perform various functions (as set forth above, for example). Memory 704, secondary storage 706 and/or any other storage are possible examples of non-transitory computer-readable media.

In one embodiment, means in the form of the processor 702 (and/or different means corresponding to different components thereof) executes instructions in the memory 704 or in the secondary storage 706 for: a) generating, by a sender system, a message key (e.g. a random message key) of a desired length for generating an encrypted message associated with two negotiated secrets; b) utilizing, by the sender system, a key derivation function to derive a message key encryption key and a message key message authentication code (MAC) key; c) encrypting, by the sender system, the message key with the derived message key encryption key; d) calculating, by the sender system, an encrypted message key MAC using the derived message key MAC key; e) calculating, by the sender system, a sub-key size by dividing a size of the message key by two; f) generating, by the sender system, random test bytes; g) calculating, by the sender system, a required number of sub-keys to have at least one noiseless sub-key with a given acceptable level of message loss (the number is the same for both negotiated secrets); h) selecting, by the sender system, a first sub-key from a first negotiated secret using a deterministic algorithm; i) encrypting, by the sender system, a first half of the message key using the first sub-key; j) encrypting, by the sender system, the test bytes using the first sub-key; k) adding, by the sender system, the first half of the message key and the test bytes encrypted using the first sub-key to the encrypted message; l) repeating, by the sender system, operations h through k until no sub-keys associated with the first negotiated secret are left; m) selecting, by the sender system, a second sub-key from a second negotiated secret using the deterministic algorithm; n) encrypting, by the sender system, a second half of the message key using the second sub-key; o) encrypting, by the sender system, the test bytes using the second sub-key; p) adding, by the sender system, the second half of the message key and the test bytes encrypted using the second sub-key to the encrypted message; q) repeating, by the sender system, operations m through p until no sub-keys associated with the second negotiated secret are left; and r) sending, by the sender system, the encrypted message, message MAC information (e.g. a message MAC computed on the ciphertext), encrypted first halves of the message key along with associated encrypted test bytes, and encrypted second halves of the message key along with associated encrypted test bytes to a receiver system.

In another embodiment, means in the form of the processor 702 (and/or different means corresponding to different components thereof) executes instructions in the memory 704 or in the secondary storage 706 to: obtain the number of sub-keys from the received encrypted message; select a sub-key from one negotiated secret (e.g. the first negotiated secret) using the deterministic algorithm used by the sender system; decrypt the test bytes using the sub-key; compare the test bytes with decrypted test bytes produced by sub-keys from another negotiated secret (e.g. the second negotiated secret); decrypt both halves of the message key if the test bytes and the decrypted test bytes produced by sub-keys from another negotiated secret are the same; use the key derivation function to derive a second message key encryption key and a second message key MAC key; verify a MAC associated with the encrypted message using the second message key MAC key; use the second message key encryption key to decrypt the encrypted message if the MAC associated with the encrypted message is verified; and/or determine not decrypt the encrypted message if the MAC associated with the encrypted message is verified.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method, comprising:
    a) generating, by a sender device, a message key of a desired length for generating an encrypted message associated with two negotiated secrets;
    b) utilizing, by the sender device, a key derivation function to derive a message key encryption key and a message key message authentication code (MAC) key;
    c) encrypting, by the sender device, the message key with the derived message key encryption key;
    d) calculating, by the sender device, an encrypted message key MAC using the derived message key MAC key;
    e) calculating, by the sender device, a sub-key size by dividing a size of the message key by two;
    f) generating, by the sender device, random test bytes;
    g) calculating, by the sender device, a required number of sub-keys to have at least one noiseless sub-key with a given acceptable level of message loss;
    h) selecting, by the sender device, a first sub-key from a first negotiated secret using a deterministic algorithm;
    i) encrypting, by the sender device, a first half of the message key using the first sub-key;
    j) encrypting, by the sender device, the test bytes using the first sub-key;
    k) adding, by the sender device, the first half of the message key and the test bytes encrypted using the first sub-key to the encrypted message;
    l) repeating, by the sender device, operations h through k until no sub-keys associated with the first negotiated secret are left;
    m) selecting, by the sender device, a second sub-key from a second negotiated secret using the deterministic algorithm;
    n) encrypting, by the sender device, a second half of the message key using the second sub-key;
    o) encrypting, by the sender device, the test bytes using the second sub-key;
    p) adding, by the sender device, the second half of the message key and the test bytes encrypted using the second sub-key to the encrypted message;
    q) repeating, by the sender device, operations m through p until no sub-keys associated with the second negotiated secret are left; and
    r) sending, by the sender device, the encrypted message, message MAC information, encrypted first halves of the message key along with associated encrypted test bytes, and encrypted second halves of the message key along with associated encrypted test bytes to a receiver device.

2. The method of claim 1, wherein the receiver device obtains the number of sub-keys from the received encrypted message.

3. The method of claim 2, wherein the receiver device selects a sub-key from one negotiated secret using the deterministic algorithm used by the sender device.

4. The method of claim 3, wherein the receiver device decrypts the test bytes using the sub-key.

5. The method of claim 4, wherein the receiver device compares the test bytes with decrypted test bytes produced by sub-keys from another negotiated secret.

6. The method of claim 5, wherein the receiver device decrypts both halves of the message key if the test bytes and the decrypted test bytes produced by sub-keys from another negotiated secret are the same.

7. The method of claim 6, wherein the receiver device uses the key derivation function to derive a second message key encryption key and a second message key MAC key.

8. The method of claim 7, wherein the receiver device verifies a MAC associated with the encrypted message using the second message key MAC key.

9. The method of claim 8, wherein the receiver device uses the second message key encryption key to decrypt the encrypted message if the MAC associated with the encrypted message is verified.

10. The method of claim 8, wherein the receiver device does not decrypt the encrypted message if the MAC associated with the encrypted message is verified.

11. A non-transitory computer readable medium storing computer code executable by a processor to perform a method comprising:
  a) generating, by a sender device, a message key of a desired length for generating an encrypted message associated with two negotiated secrets;
  b) utilizing, by the sender device, a key derivation function to derive a message key encryption key and a message key message authentication code (MAC) key;
  c) encrypting, by the sender device, the message key with the derived message key encryption key;
  d) calculating, by the sender device, an encrypted message key MAC using the derived message key MAC key;
  e) calculating, by the sender device, a sub-key size by dividing a size of the message key by two;
  f) generating, by the sender device, random test bytes;
  g) calculating, by the sender device, a required number of sub-keys to have at least one noiseless sub-key with a given acceptable level of message loss;
  h) selecting, by the sender device, a first sub-key from a first negotiated secret using a deterministic algorithm;
  i) encrypting, by the sender device, a first half of the message key using the first sub-key;
  j) encrypting, by the sender device, the test bytes using the first sub-key;
  k) adding, by the sender device, the first half of the message key and the test bytes encrypted using the first sub-key to the encrypted message;
  l) repeating, by the sender device, operations h through k until no sub-keys associated with the first negotiated secret are left;
  m) selecting, by the sender device, a second sub-key from a second negotiated secret using the deterministic algorithm;
  n) encrypting, by the sender device, a second half of the message key using the second sub-key;
  o) encrypting, by the sender device, the test bytes using the second sub-key;
  p) adding, by the sender device, the second half of the message key and the test bytes encrypted using the second sub-key to the encrypted message;
  q) repeating, by the sender device, operations m through p until no sub-keys associated with the second negotiated secret are left; and
  r) sending, by the sender device, the encrypted message, message MAC information, encrypted first halves of the message key along with associated encrypted test bytes, and encrypted second halves of the message key along with associated encrypted test bytes to a receiver device.

12. The non-transitory computer readable medium of claim 11, wherein the receiver device obtains the number of sub-keys from the received encrypted message.

13. The non-transitory computer readable medium of claim 12, wherein the receiver device selects a sub-key from one negotiated secret using the deterministic algorithm used by the sender device.

14. The non-transitory computer readable medium of claim 13, wherein the receiver device decrypts the test bytes using the sub-key.

15. The non-transitory computer readable medium of claim 14, wherein the receiver device compares the test bytes with decrypted test bytes produced by sub-keys from another negotiated secret.

16. The non-transitory computer readable medium of claim 15, wherein the receiver device decrypts both halves of the message key if the test bytes and the decrypted test bytes produced by sub-keys from another negotiated secret are the same.

17. The non-transitory computer readable medium of claim 16, wherein the receiver device uses the key derivation function to derive a second message key encryption key and a second message key MAC key.

18. The non-transitory computer readable medium of claim 17, wherein the receiver device verifies a MAC associated with the encrypted message using the second message key MAC key.

19. The non-transitory computer readable medium of claim 18, wherein the receiver device uses the second message key encryption key to decrypt the encrypted message if the MAC associated with the encrypted message is verified.

20. A sender device, comprising:
  a memory storing instructions, and
  a computer processor executing the instructions for:
  a) generating a message key of a desired length for generating an encrypted message associated with two negotiated secrets;
  b) utilizing a key derivation function to derive a message key encryption key and a message key message authentication code (MAC) key;
  c) encrypting the message key with the derived message key encryption key;
  d) calculating an encrypted message key MAC using the derived message key MAC key;
  e) calculating a sub-key size by dividing a size of the message key by two;
  f) generating random test bytes;
  g) calculating a required number of sub-keys to have at least one noiseless sub-key with a given acceptable level of message loss;
  h) selecting a first sub-key from a first negotiated secret using a deterministic algorithm;
  i) encrypting a first half of the message key using the first sub-key;

j) encrypting the test bytes using the first sub-key;
k) adding the first half of the message key and the test bytes encrypted using the first sub-key to the encrypted message;
l) repeating operations h through k until no sub-keys associated with the first negotiated secret are left;
m) selecting a second sub-key from a second negotiated secret using the deterministic algorithm;
n) encrypting a second half of the message key using the second sub-key;
o) encrypting the test bytes using the second sub-key;
p) adding the second half of the message key and the test bytes encrypted using the second sub-key to the encrypted message;
q) repeating operations m through p until no sub-keys associated with the second negotiated secret are left; and
r) sending the encrypted message, message MAC information, encrypted first halves of the message key along with associated encrypted test bytes, and encrypted second halves of the message key along with associated encrypted test bytes to a receiver device.

* * * * *